(12) United States Patent
McPherson (10) Patent No.: US 11,606,942 B2
(45) Date of Patent: Mar. 21, 2023

(54) BOWFISHING ARROW

(71) Applicant: MCP IP, LLC, Sparta, WI (US)

(72) Inventor: Mathew A. McPherson, Norwalk, WI (US)

(73) Assignee: MCP IP, LLC, Sparta, WI (US)

( * ) Notice: Subject to any disclaimer, the term of this patent is extended or adjusted under 35 U.S.C. 154(b) by 0 days.

(21) Appl. No.: 16/404,577

(22) Filed: May 6, 2019

(65) Prior Publication Data

US 2019/0335730 A1    Nov. 7, 2019

Related U.S. Application Data (60) Provisional application No. 62/690,800, filed on Jun. 27, 2018, provisional application No. 62/667,352, filed on May 4, 2018.

(51) Int. Cl.
  *F42B 6/04*    (2006.01)
  *A01K 81/04*   (2006.01)
  *F42B 6/08*    (2006.01)
  *A01K 91/03*   (2006.01)

(52) U.S. Cl.
  CPC ............ *A01K 81/04* (2013.01); *F42B 6/08* (2013.01); *A01K 91/03* (2013.01)

(58) Field of Classification Search
  CPC ...... F42B 6/00; F42B 6/02; F42B 6/04; F42B 6/06; F42B 6/08; A01K 81/00; A01K 81/04
  USPC ................................................ 473/578; 43/6
  See application file for complete search history.

(56) References Cited

U.S. PATENT DOCUMENTS

| | | | | |
|---|---|---|---|---|
| 2,484,589 A | * | 10/1949 | Richards | F42B 6/06 D21/387 |
| 2,796,691 A | * | 6/1957 | Norris | F42B 12/362 42/106 |
| 3,085,560 A | * | 4/1963 | Peters | F42B 6/04 473/578 |
| 3,214,174 A | * | 10/1965 | Saunders | F42B 6/06 473/578 |
| 3,227,454 A | * | 1/1966 | Ellenburg | F42B 6/04 43/6 |
| 3,614,947 A | * | 10/1971 | Feldman | F41B 3/02 473/585 |
| 4,544,163 A | * | 10/1985 | Scanlon | F42B 6/06 D22/115 |
| 4,645,211 A | * | 2/1987 | Beiter | F42B 6/06 473/578 |
| 4,895,128 A | * | 1/1990 | Okada | A01K 81/00 124/31 |
| 4,900,038 A | * | 2/1990 | Czetto | F42B 6/02 473/578 |
| 5,094,464 A | * | 3/1992 | Musacchia, Sr. | A01K 81/04 D22/115 |
| 5,311,855 A | * | 5/1994 | Basik | F42B 10/12 124/44.5 |

(Continued)

*Primary Examiner* — Alexander R Niconovich
(74) *Attorney, Agent, or Firm* — Laabs Intellectual Property (57) ABSTRACT

In some embodiments, an arrow comprises a shaft and a notch in an end of the arrow. The notch is arranged to receive a bowstring. A first finger recess and a second finger recess are located in proximity to the notch. The first finger recess and the second finger recess comprise opposed diverging surfaces. In some embodiments, an arrow comprises a magnetic slider.

14 Claims, 14 Drawing Sheets

(56) References Cited

U.S. PATENT DOCUMENTS

| | | | | |
|---|---|---|---|---|
| 5,335,439 A * | 8/1994 | Horton | | A01K 81/04 |
| | | | | 43/18.1 R |
| 5,553,413 A * | 9/1996 | Gannon | | A01K 81/04 |
| | | | | 473/576 |
| 5,846,147 A * | 12/1998 | Basik | | F42B 10/12 |
| | | | | 473/585 |
| 6,375,586 B1 * | 4/2002 | Cousins | | F42B 6/04 |
| | | | | 473/578 |
| 6,517,453 B2 * | 2/2003 | LaSee | | F42B 6/04 |
| | | | | 473/578 |
| 6,558,280 B1 * | 5/2003 | Kuhn | | F42B 6/04 |
| | | | | 473/578 |
| 6,920,870 B2 * | 7/2005 | Minica | | F41B 5/143 |
| | | | | 124/44.5 |
| 7,331,886 B2 * | 2/2008 | Morris | | F42B 10/18 |
| | | | | 473/578 |
| 8,241,157 B2 * | 8/2012 | Russell | | F42B 6/04 |
| | | | | 473/578 |
| 8,267,815 B2 * | 9/2012 | Braun | | A63B 65/02 |
| | | | | 473/578 |
| 8,434,466 B2 * | 5/2013 | Woods, Jr. | | F41B 5/14 |
| | | | | 124/86 |
| 8,544,455 B1 * | 10/2013 | Bruington | | F41B 7/04 |
| | | | | 43/6 |
| 8,915,807 B1 * | 12/2014 | Olson | | F42B 6/04 |
| | | | | 473/578 |
| 8,992,354 B1 * | 3/2015 | Chieppo | | F42B 6/04 |
| | | | | 473/578 |
| 9,109,852 B1 * | 8/2015 | Boester | | F41B 5/148 |
| 9,134,101 B2 * | 9/2015 | Griffith | | F42B 6/04 |
| 9,163,898 B2 * | 10/2015 | Pedersen | | F41B 5/1484 |
| 9,228,812 B1 * | 1/2016 | White | | F42B 6/04 |
| 9,329,006 B1 * | 5/2016 | Hansen | | F42B 6/08 |
| 9,551,553 B1 | 1/2017 | Boester | | |
| 9,903,682 B1 * | 2/2018 | Fyksen, Jr | | F41B 5/066 |
| 9,970,729 B1 * | 5/2018 | Coalson | | F41B 5/1484 |
| 10,030,954 B2 * | 7/2018 | Brown | | F42B 12/362 |
| 10,401,133 B1 * | 9/2019 | Sullivan | | F42B 6/06 |
| 2002/0198072 A1 * | 12/2002 | LaSee | | F42B 6/04 |
| | | | | 473/578 |
| 2003/0045381 A1 * | 3/2003 | Morris | | F42B 6/06 |
| | | | | 473/578 |
| 2019/0186866 A1 * | 6/2019 | Walthert | | A01K 81/04 |

* cited by examiner

BOWFISHING ARROW

CROSS-REFERENCE TO RELATED APPLICATIONS

This application claims the benefit of U.S. Patent Application No. 62/667,352, filed May 4, 2018, and the benefit of U.S. Patent Application No. 62/690,800, filed Jun. 27, 2018, the entire content of which are hereby incorporated herein by reference.

BACKGROUND OF THE INVENTION

This invention relates generally to archery and more specifically to arrows and nocks. In some embodiments, the invention relates to arrows that can be used for bowfishing.

Archery bows and arrows are known in the art. Arrows often have a nock or notch formed in a rear portion of the arrow to engage a bowstring. In some instances, a nock can be a separate piece that is attached to an arrow shaft.

A rear end of an arrow and/or a nock will often have a tapered shape that narrows toward the rear. This helps to give the arrow a boat-tail shape that may reduce drag.

When using a bare hand to shoot a bow, an archer's fingers can apply pressure to an arrow. In some instances, due to the tapered rear shape of an arrow or nock, inward pressure applied to the arrow at the taper results in a forward force being applied to the arrow, which encourages the arrow to separate from the bowstring.

Bows can be configured for bowfishing, and the parts can become wet and slippery. The effects of a forward force as described above can be exaggerated under bowfishing conditions.

A bowfishing arrow will generally include a line engaged with the arrow, which allows the arrow and fish to be retrieved. U.S. Pat. No. 6,517,453 teaches an example of a bowfishing arrow having a slider that moves along the length of the arrow. A line is attached to the slider. Movement of the slider allows the effective attachment point of the line to move along the length of the arrow, which makes the arrow more useful. When shooting the arrow, the slider can be placed in a forward position, allowing the line attachment point to be positioned forward of any arrow support, such as an arrow rest, so the line is not required to pass through the arrow support. The slider allows the attachment point of the line to move rearward during launch and/or and after launch, for example when the arrow impacts a fish, so the line itself does not pass through the fish. When retrieving the arrow, for example by reeling in the line, the slider can move to a rearward position where the line is less likely to be contacted by a struggling fish.

There remains a need for novel arrow structures that that improve the archery experience and improve the bowfishing experience.

All US patents and applications and all other published documents mentioned anywhere in this application are incorporated herein by reference in their entirety.

BRIEF SUMMARY OF THE INVENTION

In some embodiments, an arrow comprises a shaft and a magnetically attractive material attached to the shaft. A slider is engaged with the shaft and moveable along a length of the shaft. The slider comprises a magnet.

In some embodiments, the slider comprises a first aperture, a second aperture and a third aperture, and a line extends through the first aperture, the second aperture and the third aperture.

In some embodiments, the slider comprises a body portion and a plurality of raised flange comprising a tip and a declining surface oriented at an angle to the shaft.

In some embodiments, the arrow comprises an arrowhead attached to the shaft, the arrowhead comprising the magnetically attractive material.

In some embodiments, the arrow comprises a nock attached to the shaft, the nock comprising a stop arranged to contact the slider.

In some embodiments, the nock comprises a notch, a first finger recess and a second finger recess located in proximity to the notch. The first finger recess and the second finger recess comprising opposed diverging surfaces.

In some embodiments, an arrow comprises a shaft comprising a magnetically attractive material a slider engaged with the shaft and moveable along a length of the shaft. The slider comprises a magnet.

In some embodiments, the shaft comprises an arrowhead, the arrowhead comprising the magnetically attractive material.

In some embodiments, an arrow comprises a shaft and a notch in an end of the arrow. The notch is arranged to receive a bowstring. A first finger recess and a second finger recess are located in proximity to the notch. The first finger recess and the second finger recess comprise opposed diverging surfaces.

In some embodiments, the arrow comprises a nock and the nock comprises the first finger recess and the second finger recess.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 1:
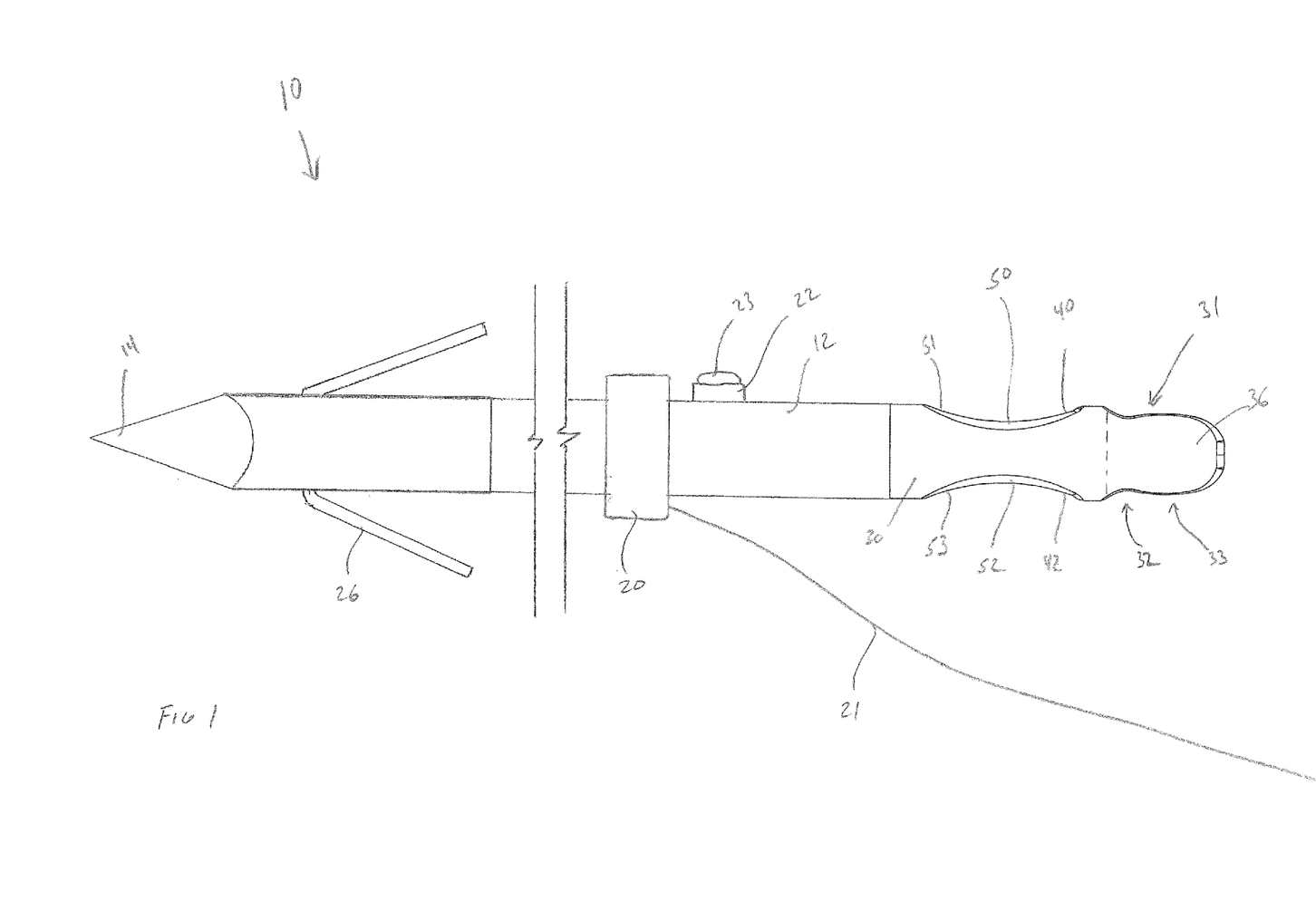
FIG. 1 shows an embodiment of an arrow.
Figure 2:
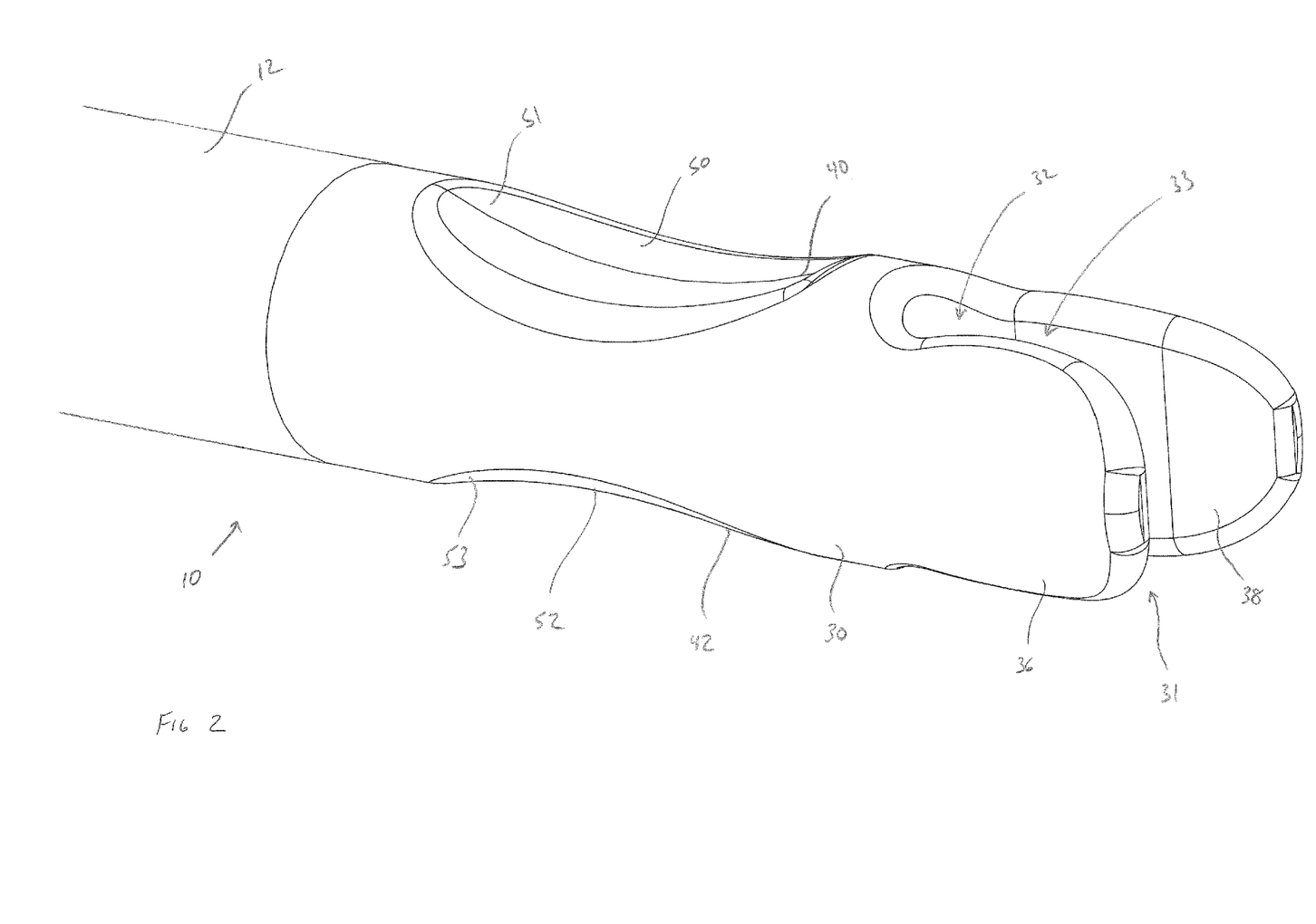
FIG. 2 shows a rear portion of the arrow of FIG. 1.

FIG. 1 shows an embodiment of an arrow 10, and FIG. 2 shows a more detailed view of the rear portion of the arrow 10.

In some embodiments, an arrow 10 comprises a shaft 12 and a tip 14. In some embodiments, an arrow 10 is configured for bowfishing and may comprise a slider 20 and attached line 21. In some embodiments, the arrow 10 comprises a barb 26. In some embodiments, the arrow 10 comprises a stop 22. In some embodiments, the stop 22 is attached to the shaft 12. In some embodiments, a fastener 23 is used to attach the stop 22 to the shaft 12.

Desirably, the arrow 10 comprises a notch 31 arranged to receive a bowstring. In some embodiments, a notch 31 is defined between opposed flanges 36, 38. In some embodiments, the notch 31 comprises a cavity portion 32 sized to contain a bowstring and a throat portion 33 that leads into the cavity portion 32. In some embodiments, the throat portion 33 is narrower than the cavity portion 32, allowing the notch 31 to positively engage the bowstring.

In some embodiments, the arrow 10 comprises a first inclined surface 40 located in proximity to the notch 31. In some embodiments, the arrow comprises a second inclined surface 42 located in proximity to the notch 31. In some embodiments, the first inclined surface 40 and the second inclined surface 42 comprise opposed diverging surfaces. In some embodiments, the opposed diverging surfaces 40, 42 diverge as the arrow 10 is traversed toward the notch 31.

In some embodiments, when a shooter's fingers apply an inward pressure to the first inclined surface 40 and the second inclined surface 42, the geometry of the surfaces 40, 42 results in a force upon the arrow 10 that pushes it rearward, for example toward the bowstring.

In some embodiments, an arrow 10 comprises a first finger recess 50. In some embodiments, the first finger recess 50 comprises a first declined surface 51 and the first inclined surface 40. In some embodiments, an arrow 10 comprises a second finger recess 52. In some embodiments, the second finger recess 52 comprises a second declined surface 53 and the second inclined surface 42.

In some embodiments, the first finger recess 50 and the second finger recess 52 are located on opposite sides of the arrow 10.

In some embodiments, the notch 31 and/or finger recesses 50, 52 are formed directly in the arrow 10, for example being formed directly in the material that comprises the arrow shaft 12.

In some embodiments, the arrow 10 comprises a shaft 12 and a separate nock 30 member that is attached to the shaft 12.

In some embodiments, the finger recesses 50, 52 are formed in the arrow shaft 12 and a nock 30 comprises the notch 31.

In some embodiments, a nock 30 comprises both the finger recesses 50, 52 and the notch 31, and the nock 30 is attached to the shaft 12.

Figure 3:
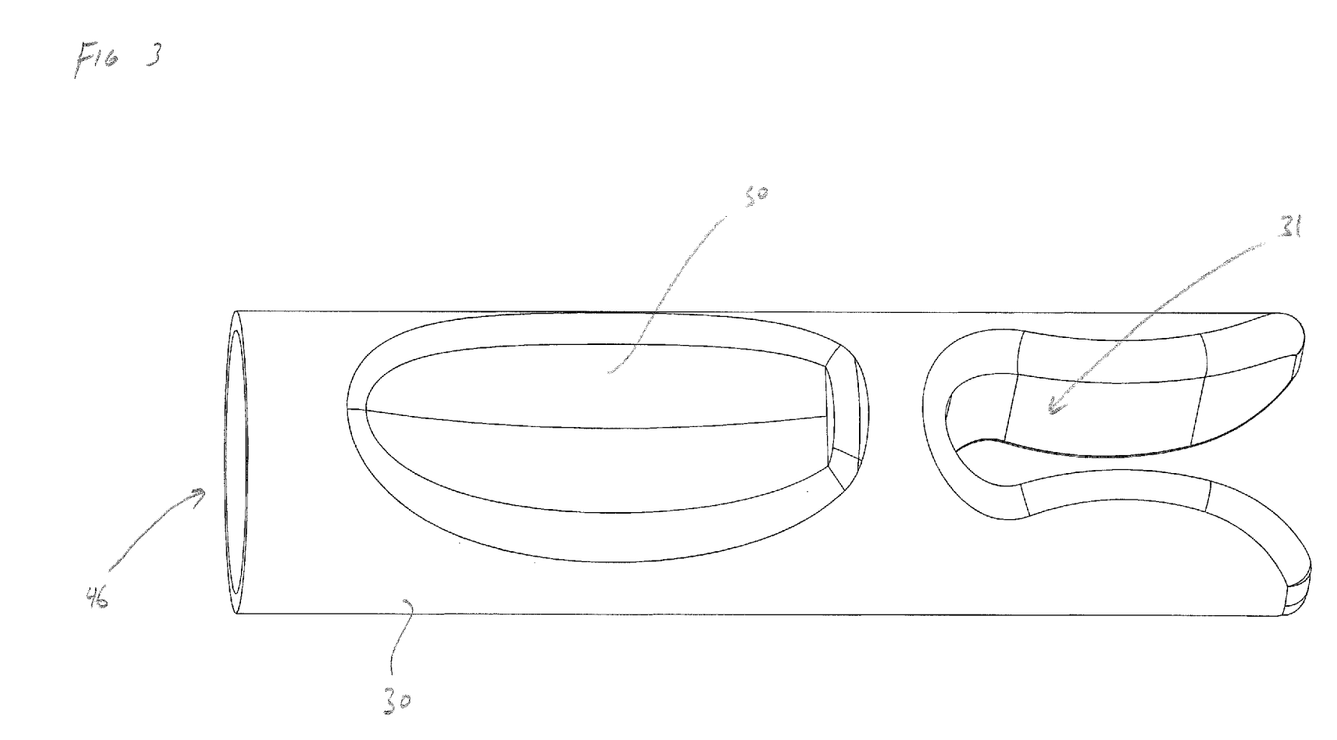
FIGS. 3 and 4 show an embodiment of a nock.
Figure 4:
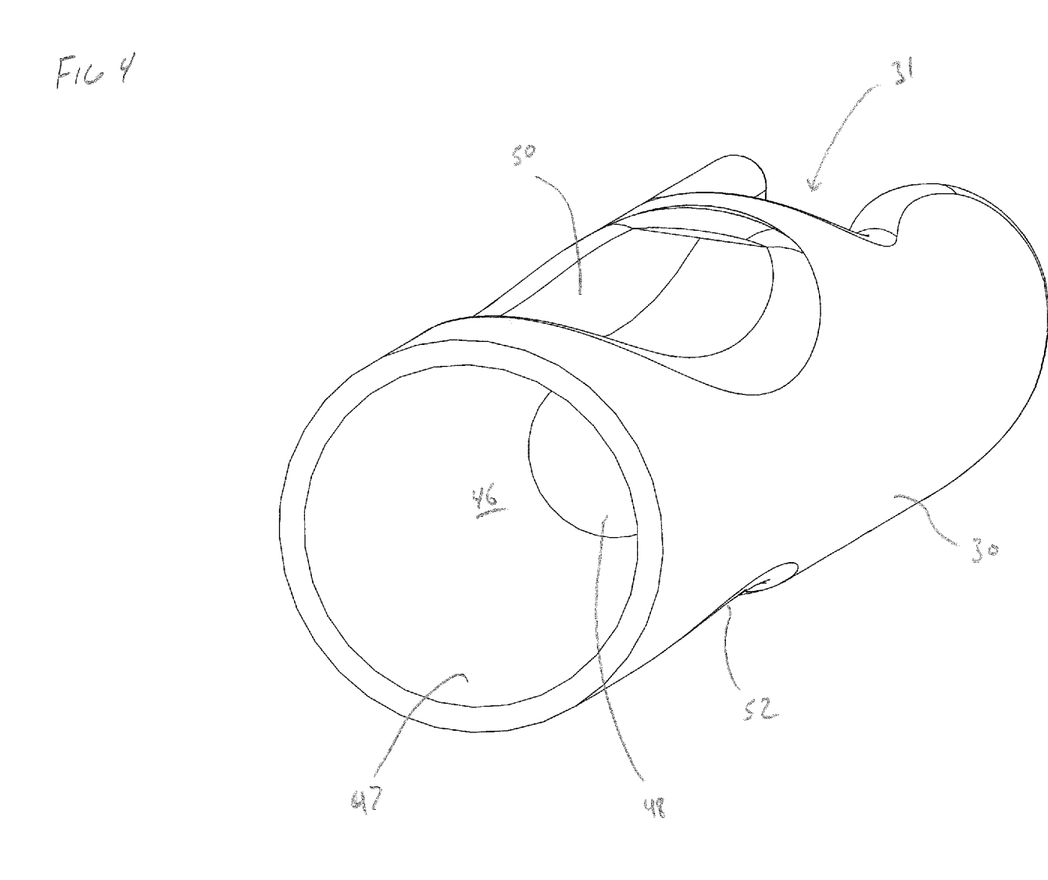

FIGS. 3 and 4 show views of an embodiment of a nock 30 that is suitable for attachment to an arrow shaft 12. In some embodiments, a nock 30 comprises features as described herein, such as finger recesses 50, 52 and a notch 31. In some embodiments, the nock 30 comprises a cavity 46 configured for attachment to an arrow shaft 12.

A cavity 46 can have any suitable shape, and the arrow shaft 12 desirably comprises a shape arranged to engage with the shape of the cavity 46. In some embodiments, a cavity 46 is cylindrical. In some embodiments, a cavity 46 is conical or frustoconical, for example comprising a tapered conical wall 47. In some embodiments, the cavity 46 comprises a back wall 48.

Figure 5:
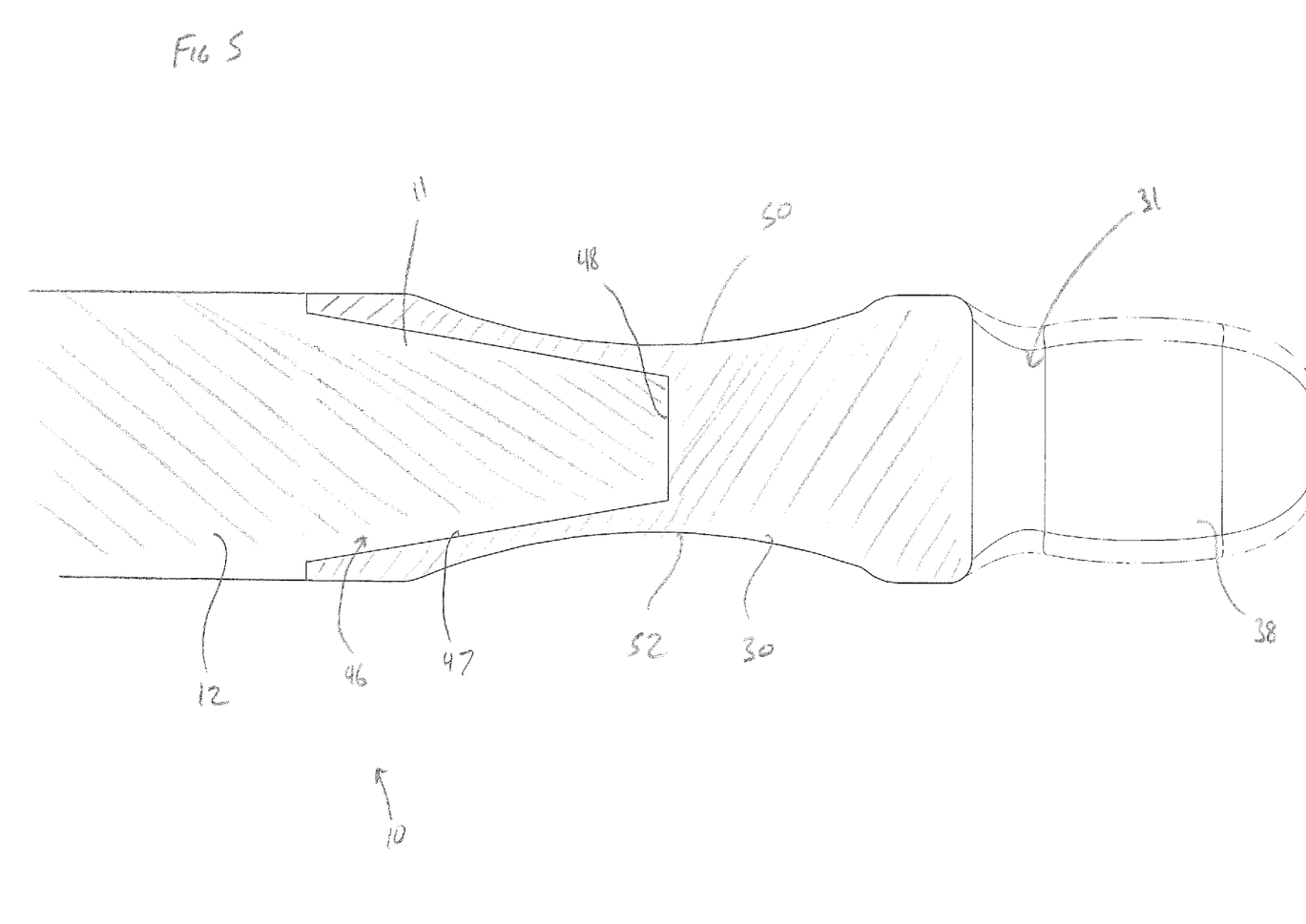
FIG. 5 shows an embodiment of a nock engaged with an arrow shaft.

FIG. 5 shows a cross-sectional view of the nock 30 of FIGS. 3 and 4 engaged with an embodiment of an arrow shaft 12. In some embodiments, the shaft 12 comprises a tapered portion 11 shaped complimentary to the cavity 46.

Figure 6:
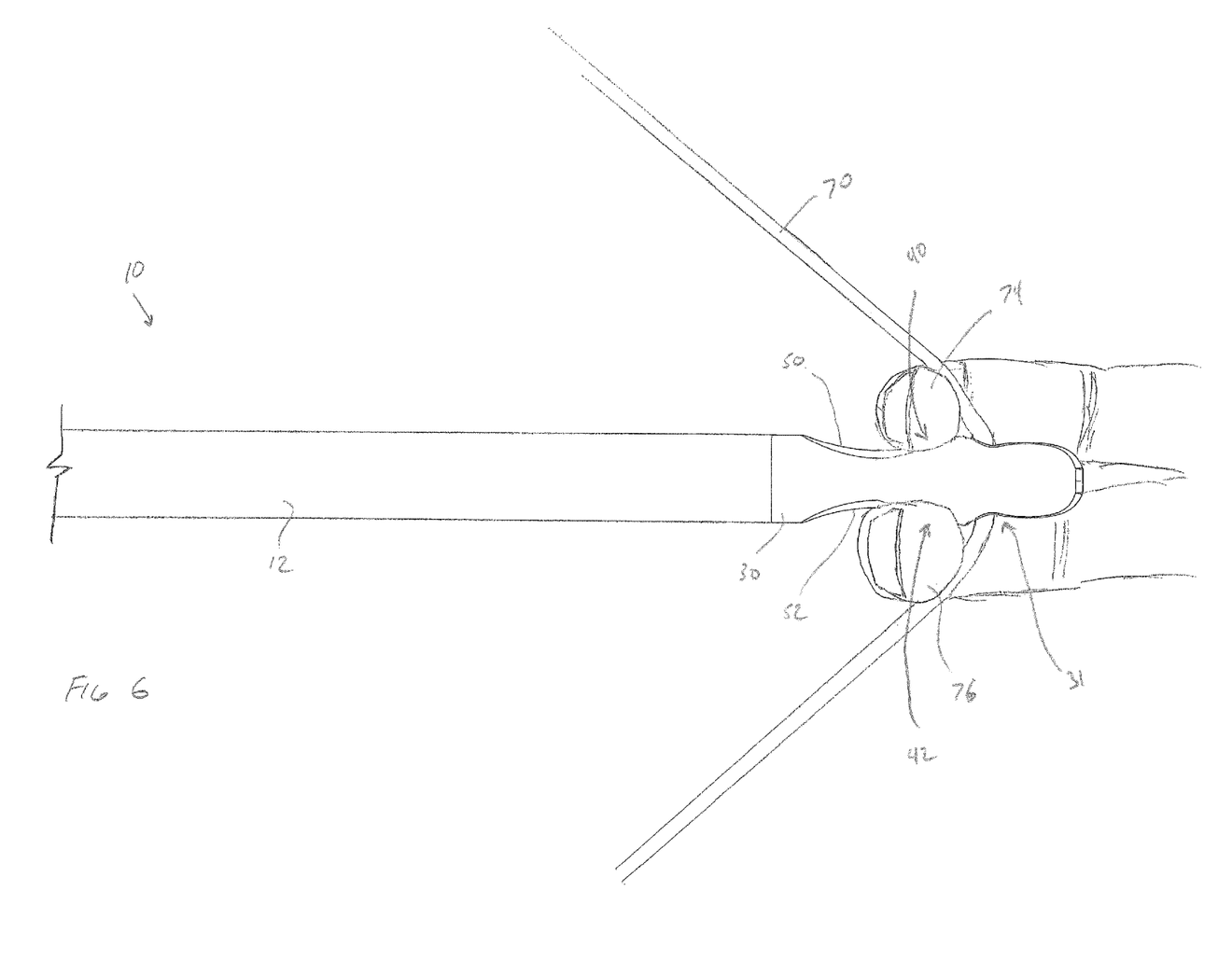
FIG. 6 shows an embodiment of an arrow being drawn with a bowstring.

FIG. 6 shows an embodiment of an arrow 10 and depicts an interaction between a shooter's fingers 74, 76, the bowstring 70 and the inclined surfaces 40, 42. The bowstring 70 is engaged with the notch 31. A first finger 74 is at least partially positioned in the first finger recess 50 and a second finger 76 is at least partially positioned I the second finger recess 52. The first finger 74 contacts the first inclined surface 40 and the second finger 76 contacts the second inclined surface 42.

As the bowstring 70 is drawn, the bowstring 70 will typically assume an orientation as shown in FIG. 6, for example contacting the fingers 74, 76 and extending in a forward angled direction. In some embodiments, the bowstring 70 will squeeze the fingers 74, 76 and place an inward force on each finger 74, 76. The fingers 74, 76 in turn apply an inward force to each respective inclined surface 40, 42. A net force applied to the arrow 10 by the fingers 74, 76 results in a rearward force being applied to the arrow 10, which encourages the arrow 10 to remain engaged with the bowstring 70.

Figure 7:
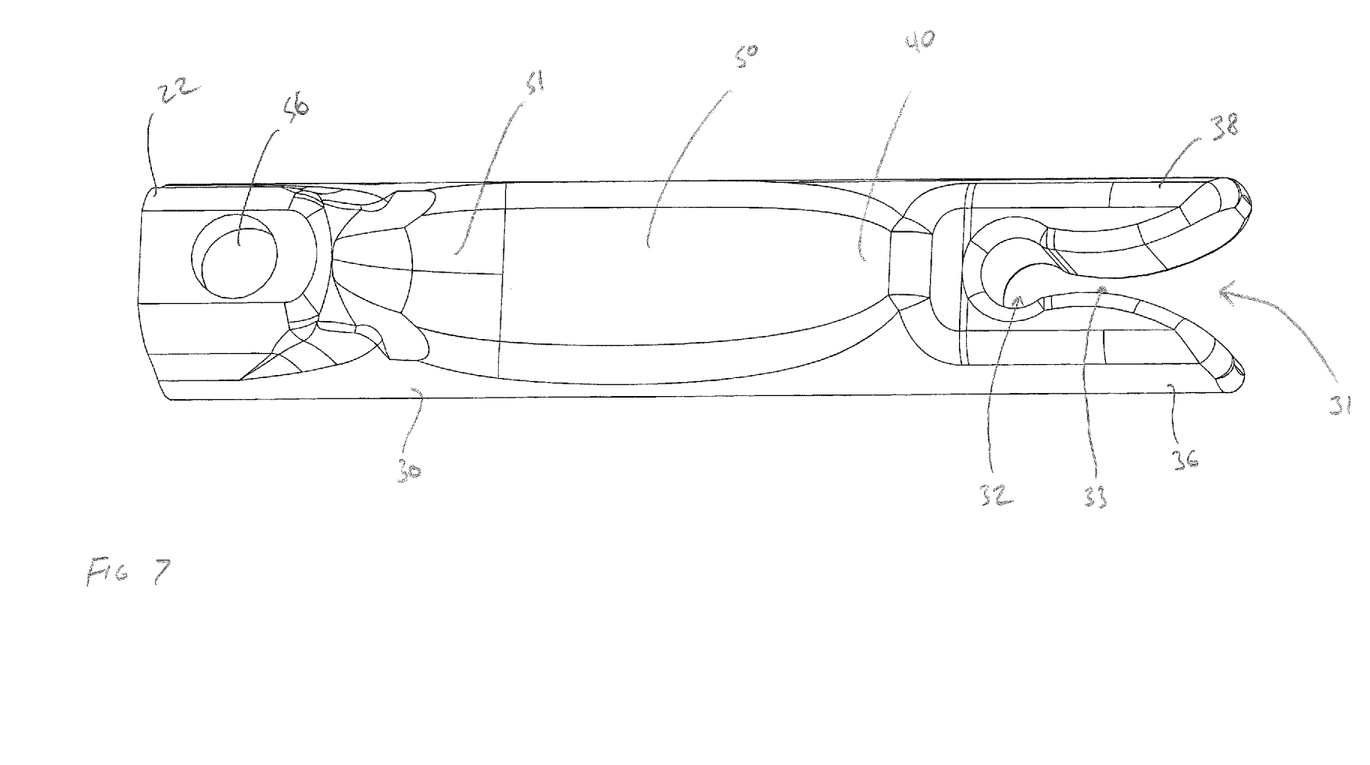
FIG. 7 shows another embodiment of a nock.
Figure 8:
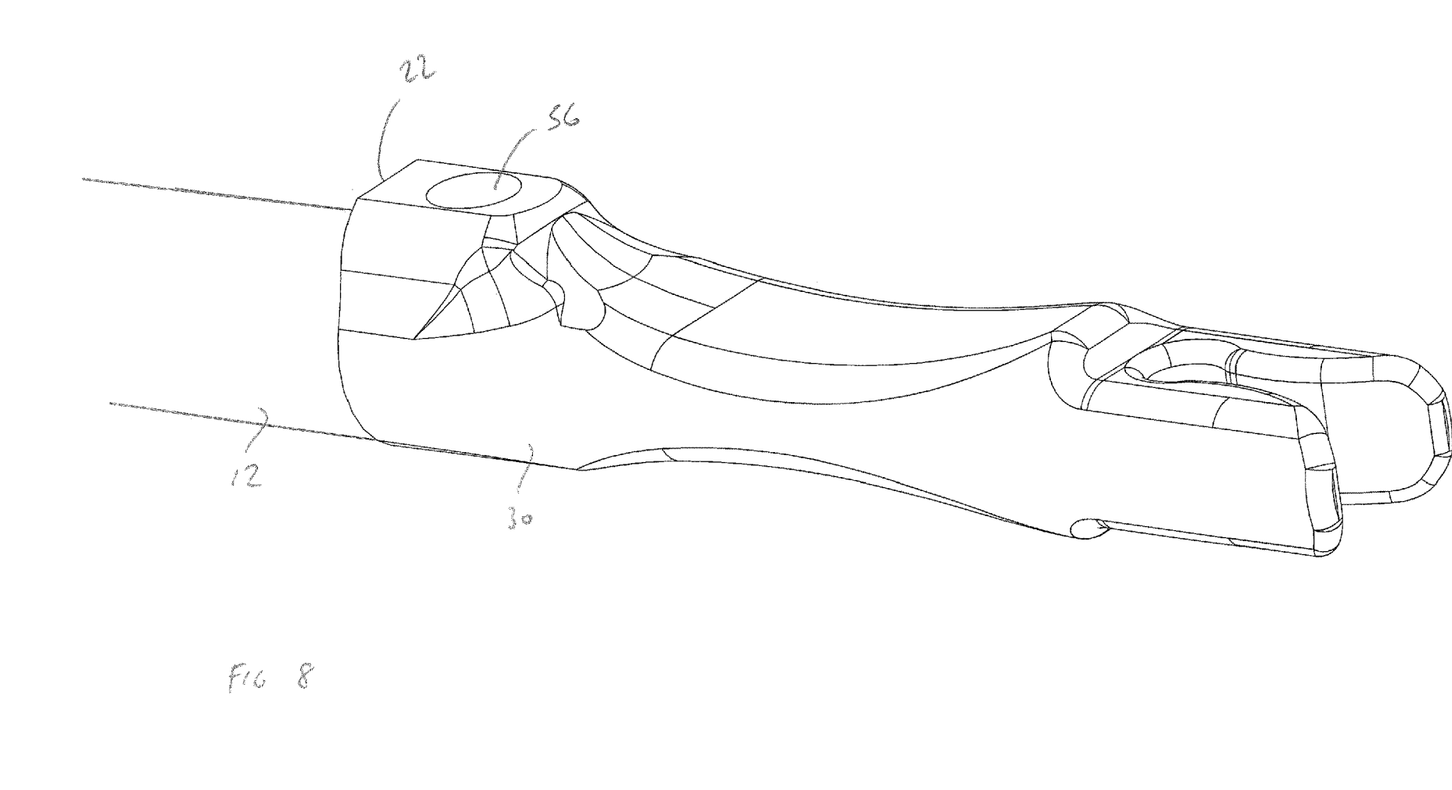
FIG. 8 shows another embodiment of an arrow.

FIG. 7 shows another embodiment of a nock 30. FIG. 8 shows an embodiment of an arrow 10 comprising the nock 30 of FIG. 7.

In some embodiments, a nock 30 comprises features as previously described, and further comprises a stop 22. In some embodiments, the nock 30 is formed from a single piece of material and comprises an integral stop 22.

In some embodiments, a stop 22 comprises a portion that extends outwardly from a central axis of the nock 30 a greater distance than other portions of the nock 30.

In some embodiments, the nock 30 comprises an aperture 56 arranged to receive a fastener that attaches the nock 30 to an arrow shaft 12. In some embodiments, the aperture 56 is formed in the stop 22 or adjacent to the stop 22.

FIG. 8 shows the nock 30 engaged with the arrow shaft 12. Desirably, the stop 22 protrudes outwardly above an outer surface of the shaft 12. Desirably, the stop 22 is arranged to limit travel of a slider 20 (see FIG. 1) that is slidably engaged with the arrow shaft 12.

In some embodiments, protrusions can be provided on an arrow 10, or on nock 30, in place of the first inclined surface 40 and second inclined surface 42 as described herein. In some embodiments, a shooter's fingers will contact the protrusions and apply forces to the protrusions that bias the arrow 10 in the rearward direction.

Figure 9:
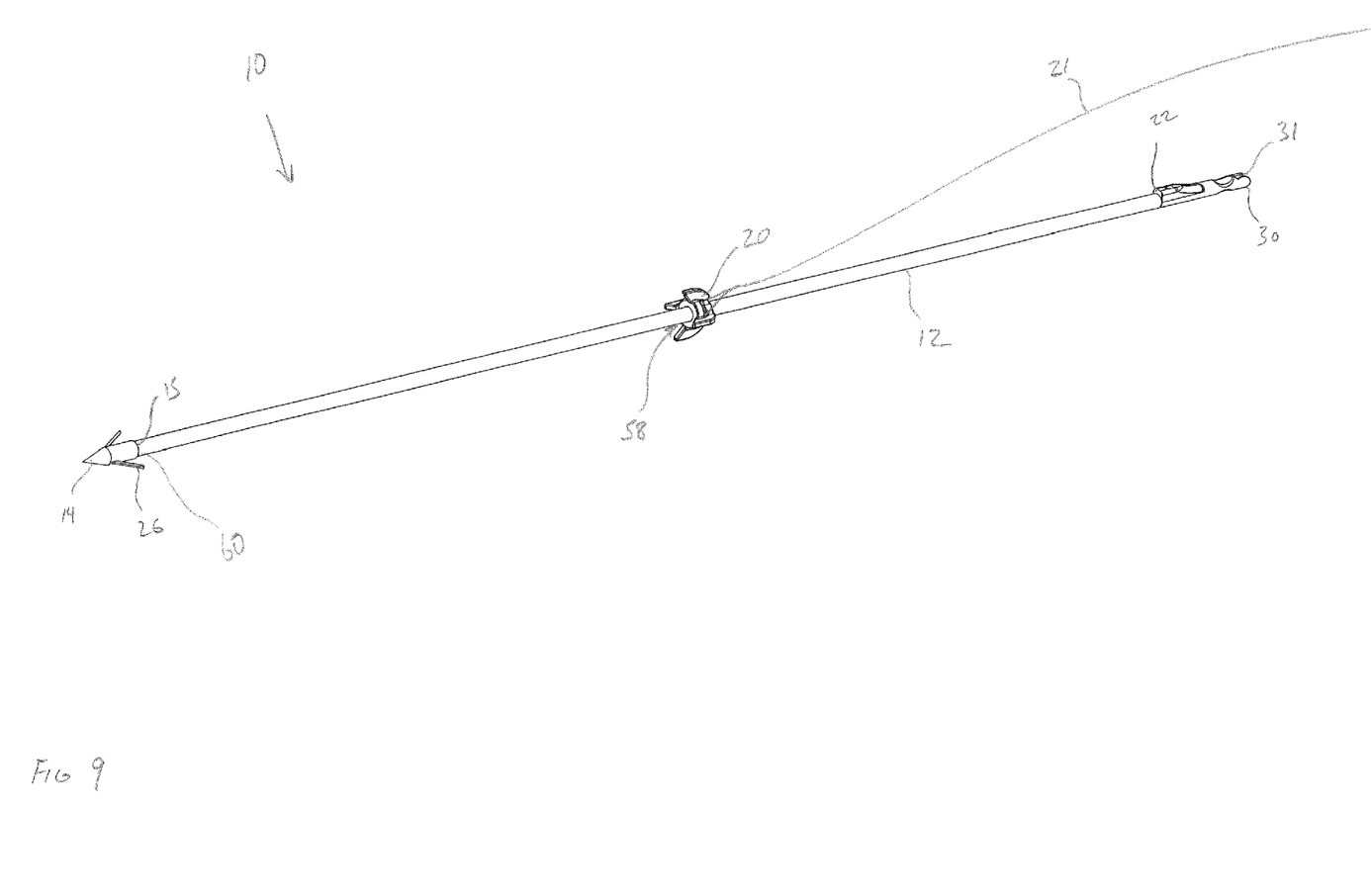
FIG. 9 shows another embodiment of an arrow.

FIG. 9 shows another embodiment of an arrow 10. In some embodiments, the arrow 10 is suitable for bowfishing. In some embodiments, the arrow 10 comprises a shaft 12, an arrowhead 14, a nock 30 and a slider 20 with attached line 21. In some embodiments, the slider 20 is arranged to traverse along the length of the shaft 12. In some embodiments, the arrowhead 14 comprises a barb 26. In some embodiments, the arrow 10 comprises a stop 22 arranged to limit travel of the slider 20 along the length of the shaft 12.

Figure 10:
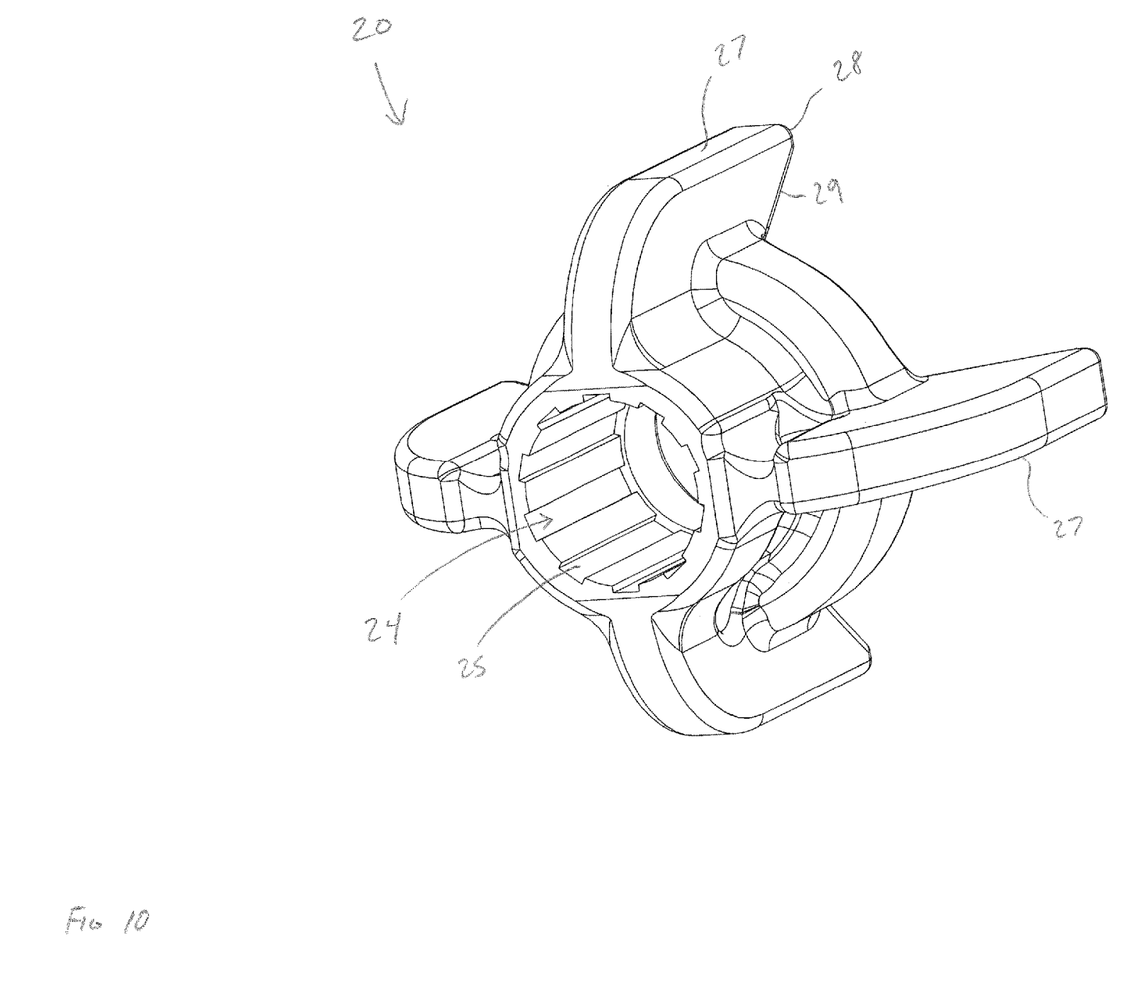
FIGS. 10 and 11 show an embodiment of a slider.
Figure 11:
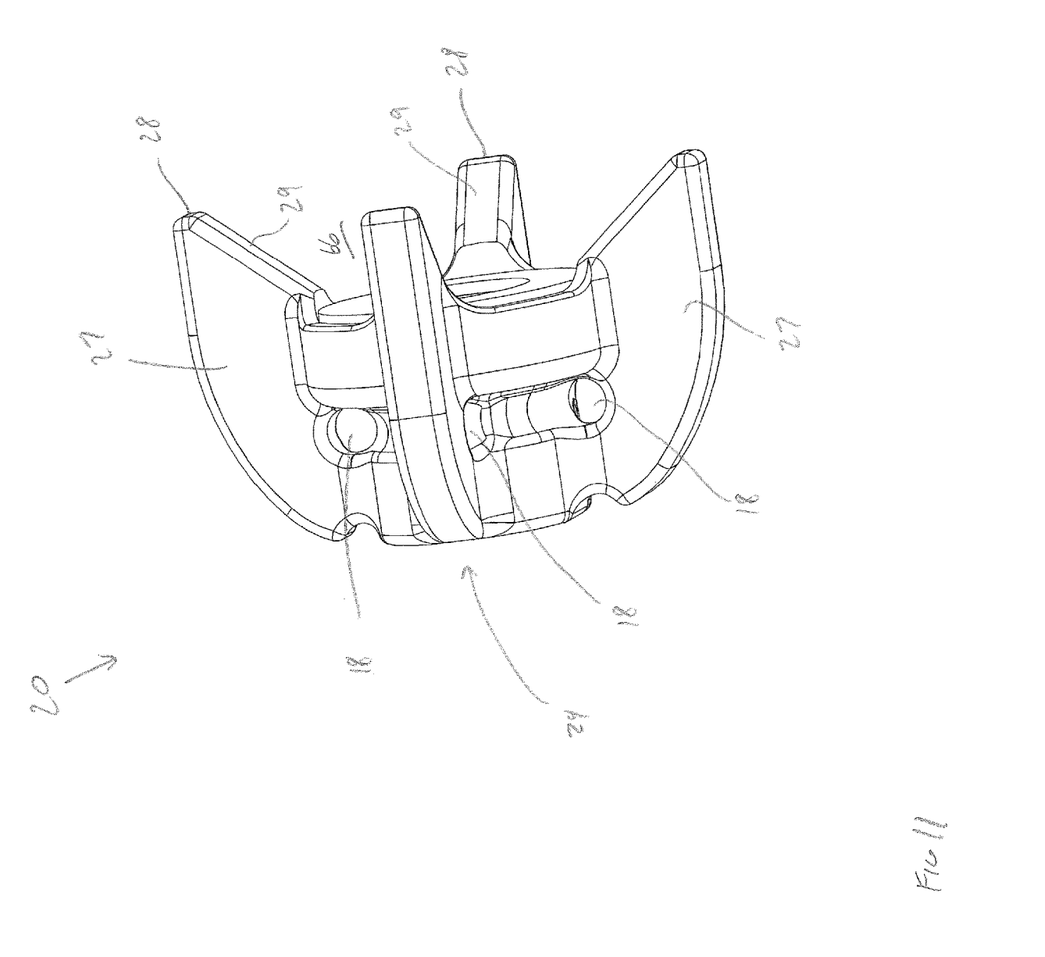

FIGS. 10 and 11 show views of an embodiment of a slider 20. In some embodiments, the slider 20 comprises a central cavity 24 that receives the arrow shaft 12. In some embodiments, a sidewall 25 that defines the cavity 24 comprises a non-circular cross-sectional shape. As shown in FIG. 10, the sidewall 25 comprises protrusions and recesses. In some embodiments, the cavity 24 comprises a polygonal cross-sectional shape. In some embodiments, the cavity 24 comprises a cross-sectional shape that is different from a cross-sectional shape of the shaft 12. When the cavity 24 provides recesses that extend outward from the shaft 12, the recesses can act as channels for water that allow the slider 20 to traverse the shaft 12 with less resistance.

In some embodiments, the slider 20 fully surrounds the arrow shaft 12.

In some embodiments, the slider 20 comprises a plurality of flanges 27. In some embodiments, a flange 27 extends outwardly from a main body of the slider 20. In some embodiments, a flange 27 extends outwardly from the main body of the slider 20 in a radial direction. In some embodiments, a plurality of flanges 27 are equally spaced around a perimeter of the slider 20. In some embodiments, flanges 27 act as vanes that help to stabilize the arrow 10 during flight.

In some embodiments, the flanges 27 function as barbs that contact and engage a fish. As an arrow 10 impacts a fish, the arrowhead 14 will penetrate and pass through the fish. In some embodiments, when the slider 20 contacts the fish, the flanges 27 abut a side of the fish and prevent the slider 20 from passing through the hole created by the arrowhead 14.

In some embodiments, a flange 27 comprises a tip 28 that extends forward of the body of the slider 20. In some embodiments, a flange 27 comprises a declined surface 29 extending between the tip 28 and the main body of the slider 20. In some embodiments, the declined surface 29 is oriented at an angle to a central axis of the arrow 10. In some embodiments, the declined surfaces 29 of the flanges 27 act collectively to form a cavity zone 66 that helps prevent the slider 20 from passing through the fish. The declined orientation of the surfaces 29 biases fish material in an inward direction, encouraging material to collect in the cavity zone 66 and impede forward movement of the slider 20.

In some embodiments, the slider 20 comprises apertures 18 for receiving a line 21. In some embodiments, a pair of apertures 18 are provided on opposing sides of the slider 21 for a balanced connection. In some embodiments, the apertures 18 are formed in the flanges 27. In some embodiments, three or more apertures 18 are provided. In some embodiments, a plurality of the flanges 27 are each provided with an aperture and at least one flange 27 does not include an aperture 18.

Figure 12:
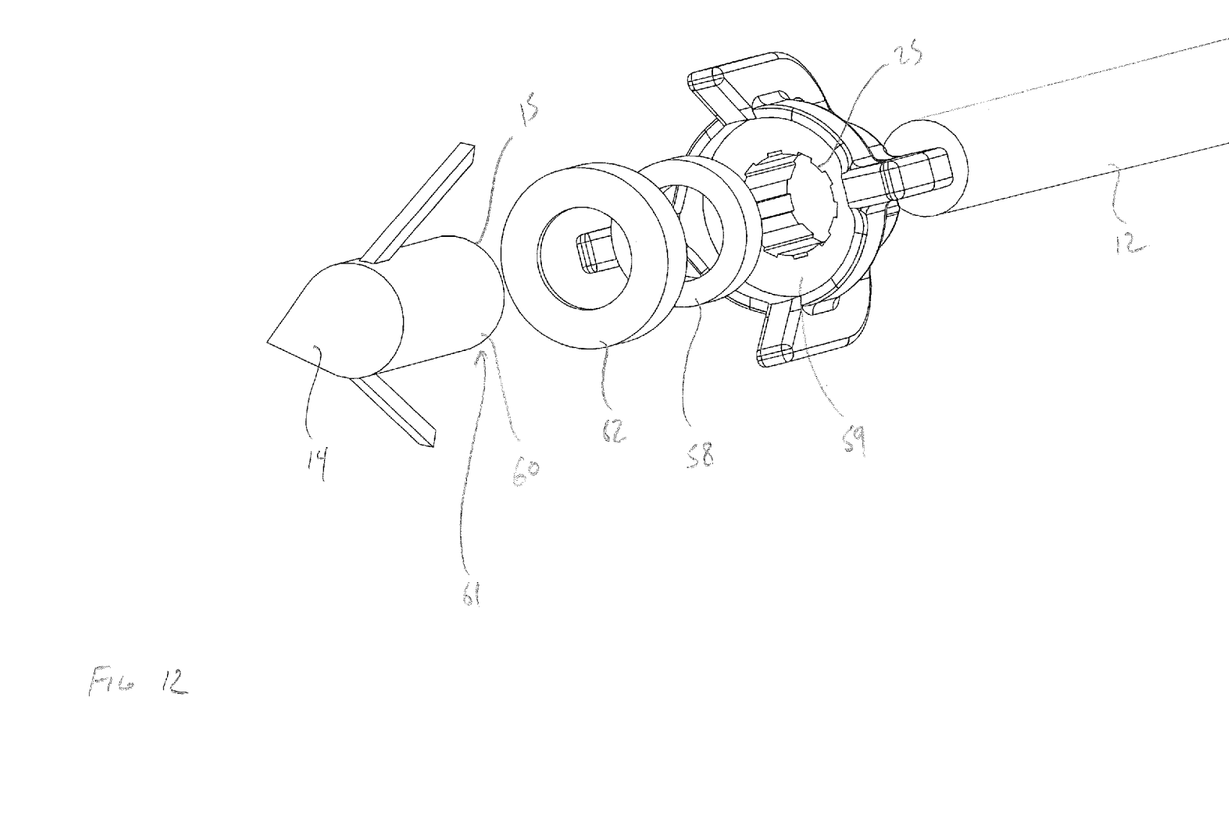
FIGS. 12 and 13 show exploded views of an embodiment of an arrow.
Figure 13:
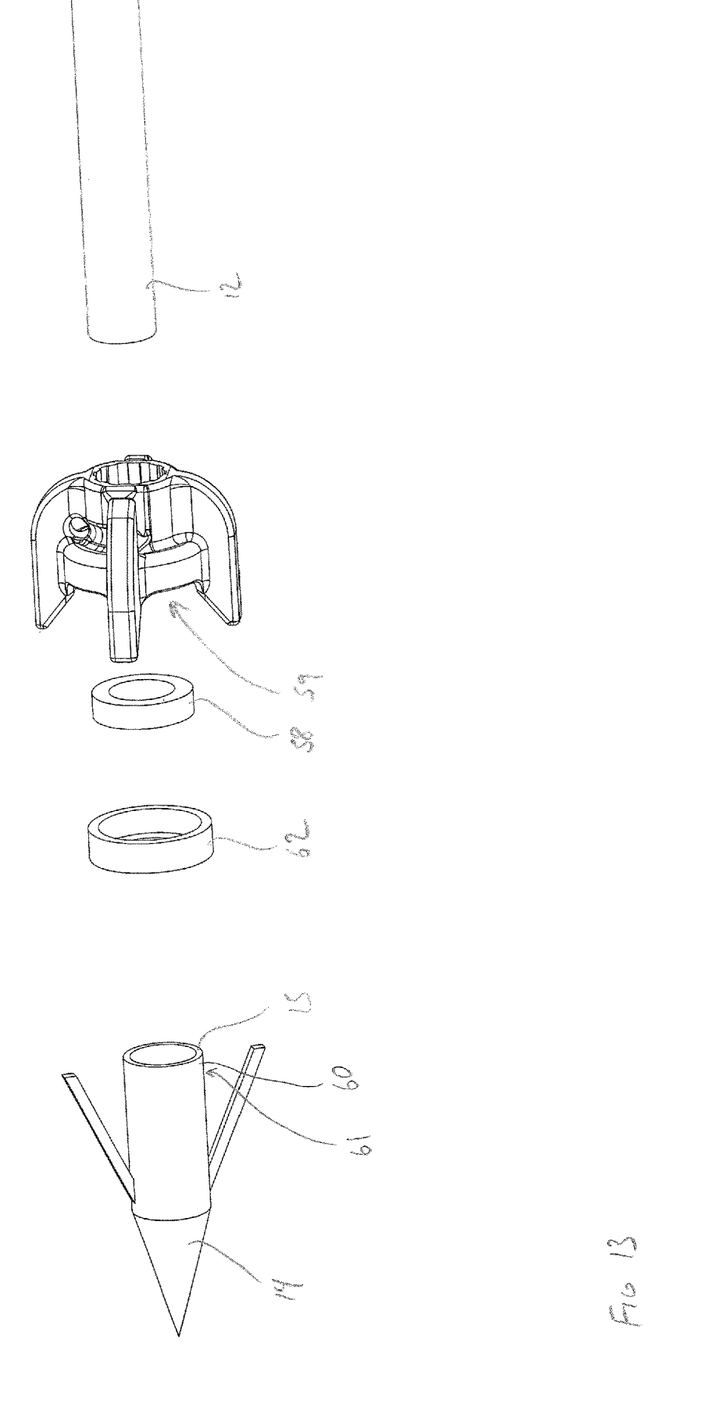

FIGS. 12 and 13 show exploded views of an embodiment of an arrow 10. In some embodiments, the arrow 10 is arranged to temporarily retain the slider 20 in a forward position along the length of the arrow 10. In some embodiments, the slider 20 is arranged to remain in a forward position as the arrow is launched from a bow, but is free to move rearward when external forces are applied to the slider 20, for example as the arrowhead 14 passes through a fish and the slider 20 contacts a side of the fish. In some embodiments, the slider 20 is biased to a predetermined location along the length of the arrow 10 under magnetic force. In some embodiments, the slider 20 is biased to a forward location, for example proximate to a back end 15 of the arrowhead 14.

In some embodiments, the arrow 10 comprises a magnet 58 and a magnetically attractive material 61 (e.g. a ferritic material, a second magnet, etc.). In some embodiments, either the magnet 58 or the magnetically attractive material 61 is associated with the slider 20, and the other of the magnet 58 or the magnetically attractive material is associated with the predetermined location 60 to which the slider is biased. The predetermined location 60 can be anywhere along the length of the arrow 10. As shown in FIGS. 9, 12 and 13, the slider 20 comprises a magnet 58 and the arrowhead 14 comprises a magnetically attractive material 61. Thus, in some embodiments, the arrowhead 14 defines the predetermined location 60 and the slider 20 is magnetically attracted to the arrowhead 14.

In some embodiments, the magnetically attractive material 61 can be provided as a separate material that is attached to the shaft 12. For example, in some embodiments, a magnetically attractive pin or plug can be provided that extends through the shaft 12 at the predetermined location 60. In some embodiments, a metal ring that surrounds the shaft 12 can be provided at the predetermined location 60. In some embodiments, the predetermined location 60 acts as a forward stop for the slider 20.

In some embodiments, a magnet 58 can be provided at the predetermined location 60 and the slider 20 comprises a magnetically attractive material.

As shown in FIGS. 12 and 13, in some embodiments, the slider 20 carries the magnet 58. In some embodiments, the body of the slider 20 defines a recess 59 or cavity arranged to receive the magnet 58. In some embodiments, the slider 20 comprises a cover 62 arranged to retain and protect the magnet 58. In some embodiments, the cover 62 is oriented between the magnet 58 and the magnetically attractive material 61, and the cover 62 provides impact protection for the magnet 58. In some embodiments, the cover 62 comprises a material that is less brittle and/or more malleable than the material of the magnet 58.

The magnet 58 can have any suitable size, shape and configuration. In some embodiments, the magnet 58 comprises a ring that surrounds the shaft 12. An inner diameter of a ring magnet can be of any suitable size and in some embodiments, is sized to provide space between the magnet 58 and the shaft 12, for example to allow clearance for water similar to a contoured inner sidewall 25 of the slider 20.

In some embodiments, a stop 22 is provided, for example to limit rearward travel of the slider 20. In some embodiments, a stop 22 comprises a flange that extends radially outward from the shaft 12 and impedes movement of the slider 20. Any suitable stop 22 mechanism can be used, and the stop 22 can be provided at any suitable location on the shaft 12.

Figure 14:
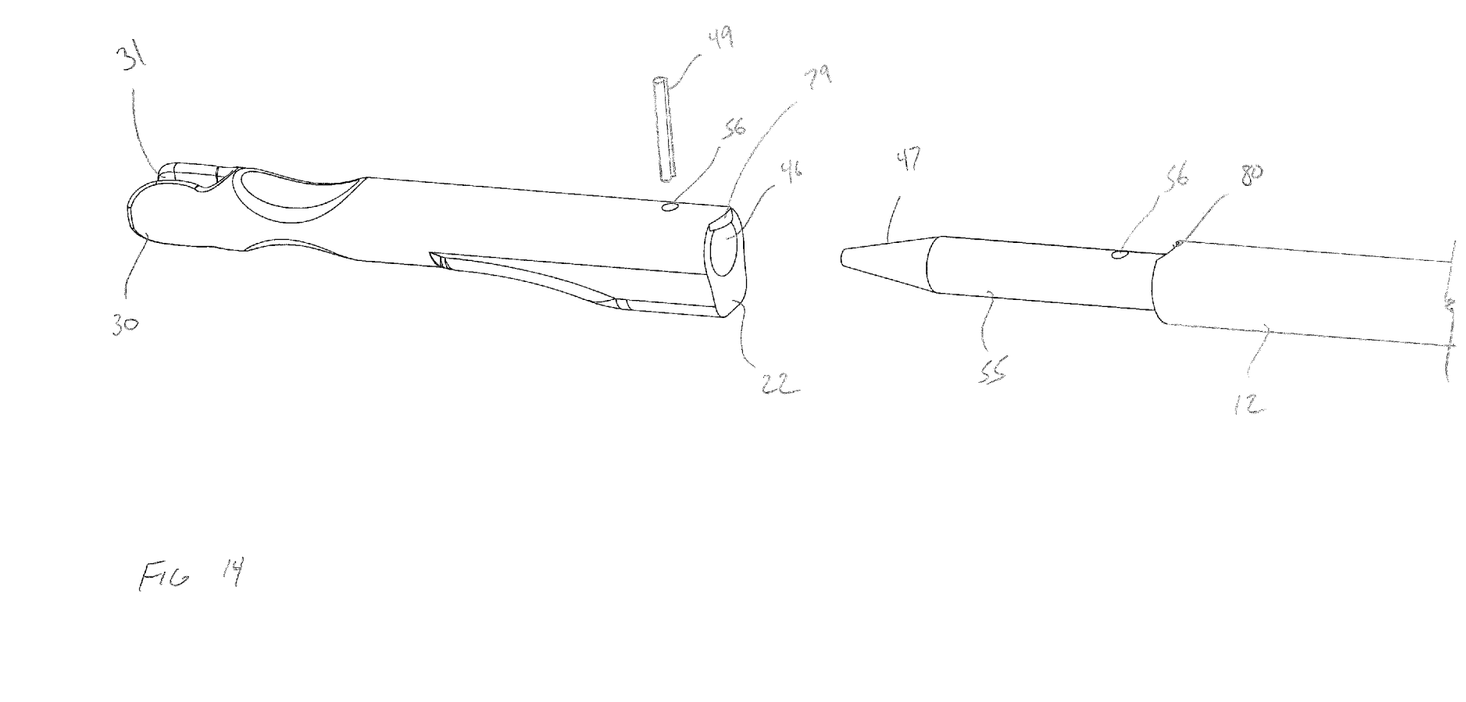
FIG. 14 shows an embodiment of a nock and arrow shaft.

FIGS. 9 and 14 show an embodiment of a nock 30. In some embodiments, a nock 30 is attached to a rear end of the shaft 12. Desirably, the nock 30 comprises a notch 31 configured to engage a bowstring. In some embodiments, the nock 30 comprises a stop 22.

In some embodiments, the nock 30 comprises a cavity 46, and a portion of the shaft 12 is received in the cavity 46. In some embodiments, an end portion of the shaft 12 is shaped to mate with the nock 30. In some embodiments, the shaft 12 comprises a protrusion 55 shaped to occupy the cavity 46. In some embodiments, the protrusion 55 comprises a cylindrical portion and a tapered portion 47 such as a conical wall, and the cavity 46 comprises cylindrical and tapered portions.

In some embodiments, the nock 30 and/or shaft 12 comprise an alignment feature arranged to rotationally align the nock 30 and shaft 12. In some embodiments, an alignment feature comprises a shaped key 79 on either the nock 30 or shaft 12, and a matingly shaped recess 80 on the other of the nock 30 or shaft 12.

The nock 30 can be attached to the shaft 12 using any suitable method. In some embodiments, cavities 56 are provided in the nock 30 and in the shaft 12, and a spring pin 49 or other suitable fastener is oriented in the cavities 56.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A bowfishing arrow comprising:
   a shaft comprising a non-magnetic material, an end of the shaft comprising a notch arranged to receive a bowstring;
   a magnetically attractive material attached to the shaft; and
   a slider engaged with the shaft and moveable along a length of the shaft between a first position and a second position, the slider surrounding the shaft, the slider comprising a magnet, a magnetic force between the magnet and the magnetically attractive material biasing the slider to the first position, a line attached to the slider.

2. The bowfishing arrow of claim 1, the slider comprising a first aperture, a second aperture and a third aperture, the line extending through the first aperture, the second aperture and the third aperture.

3. The bowfishing arrow of claim 1, the slider comprising a body portion and a plurality of raised flanges, each raised flange extending radially outward from the body portion.

4. The bowfishing arrow of claim 3, the plurality of raised flanges comprising a first flange and a second flange, the first flange comprising a tip and a declining surface oriented at an angle to the shaft.

5. The bowfishing arrow of claim 4, the second flange comprising a tip and a declining surface oriented at an angle to the shaft, the first flange and second flange defining a cavity adjacent to the slider body portion.

6. The bowfishing arrow of claim 1, comprising an arrowhead attached to the shaft, the arrowhead comprising the magnetically attractive material.

7. The bowfishing arrow of claim 1, the magnet comprising a ring.

8. The bowfishing arrow of claim 7, the ring surrounding the shaft.

9. The bowfishing arrow of claim 1, comprising a nock attached to the shaft, the nock comprising a stop arranged to contact the slider.

10. The bowfishing arrow of claim 1, comprising a nock attached to the shaft, the nock comprising the notch, a first finger recess and a second finger recess located in proximity to the notch, the first finger recess and the second finger recess comprising opposed diverging surfaces.

11. A bowfishing arrow comprising:
    a shaft comprising a non-magnetic material, a first end and a second end, the first end comprising a tip comprising a magnetically attractive material, the second end comprising a notch arranged to receive a bowstring; and
    a slider engaged with the shaft and moveable along a length of the shaft between a first position and a second position, the slider surrounding the shaft, the slider comprising a magnet, a magnetic force between the magnet and the magnetically attractive material biasing the slider to the first position, a line attached to the slider.

12. The bowfishing arrow of claim 11, the shaft comprising an arrowhead, the arrowhead comprising the magnetically attractive material.

13. The bowfishing arrow of claim 11, comprising a nock attached to the shaft, the nock comprising the notch, a first finger recess and a second finger recess located in proximity to the notch, the first finger recess and the second finger recess comprising opposed diverging surfaces.

14. The bowfishing arrow of claim 13, the nock comprising a slider stop.

* * * * *